Aug. 28, 1962     W. R. LINKE     3,051,049
CATADIOPTRIC OBJECTIVE
Filed March 2, 1959
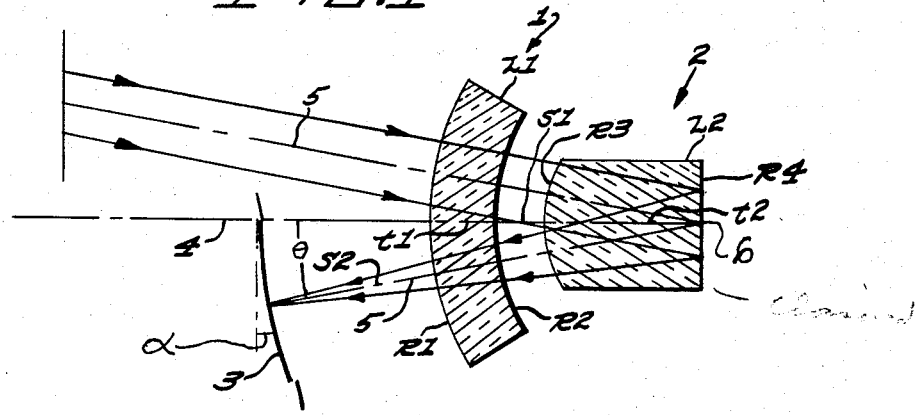
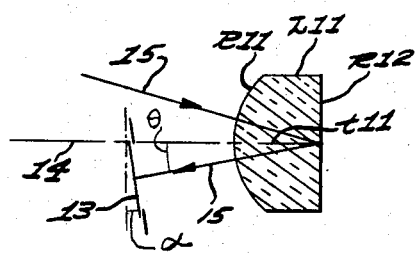
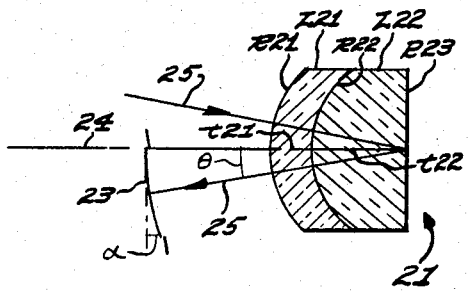
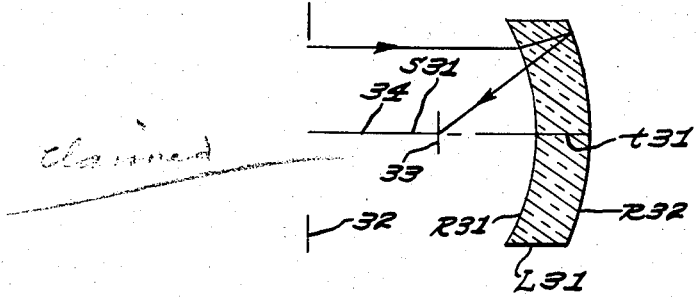
Inventor
Walter R. Linke
By Robert F. Miehle Jr.
Atty.

United States Patent Office 3,051,049
Patented Aug. 28, 1962

3,051,049
CATADIOPTRIC OBJECTIVE
Walter R. Linke, Chicago, Ill., assignor to Bell & Howell Company, Chicago, Ill., a corporation of Illinois
Filed Mar. 2, 1959, Ser. No. 796,484
8 Claims. (Cl. 88—57)

This invention relates to a catadioptric objective, and more particularly to an off-center or oblique catadioptric objective in which the refractive surfaces are concentric relative to one another.

An object of the invention is to provide an objective having a mirror surface positioned behind a group of refractive surfaces concentric with one another so that aberrations introduced into the objective by light traveling to the mirror are removed as the reflected rays travel back through the refractive surfaces.

Another object of the invention is to provide an objective having a front meniscus lens and a rear convex-plano combined lens mirror with the refractive surfaces concentric about the central point of the mirror along with a film plane in front of the front component and wholly to one side of the longitudinal axis of the objective.

Another object of the invention is to provide an off-axis or oblique objective in which one or more lenses are positioned in front of a mirrored surface with the center of curvature of each refractive surface of the lens or lenses being on the mirrored surface.

Yet another object of the invention is to provide an oblique objective comprising a single lens having a plano mirror rear surface and a convex refractive front surface having a radius of curvature equal to the axial thickness of the objective.

A further object of the invention is to provide an oblique objective including a two lens compound component in which the rear lens has a plano mirror rear surface and the front surface of the rear lens is convex and has a radius of curvature equal to the axial thickness of the rear surface. The front lens is meniscus and may be cemented to the rear lens, the front surface of the front lens being concentric with the front surface of the rear lens.

It is to be understood that the terms "front" and "rear" as herein used refer to the ends of the objective respectively nearer the longer and shorter conjugates thereof.

In the accompanying drawing:

FIG. 1 illustrates an objective forming a specific embodiment of the invention;

FIG. 2 is a longitudinal section of an objective forming an alternate embodiment of the invention;

FIG. 3 is a longitudinal section of an objective forming another embodiment of the invention; and FIG. 4 is a longitudinal section of an objective forming another embodiment of the invention.

Referring to the drawings, the objective shown in FIG. 1 comprises a front component 1 and a rear component 2 aligned along a longitudinal axis 4, and having a focal plane or film plane 3. The components 1 and 2 are composed of lens $L_1$ and lens-mirror $L_2$ having radii of curvature of optical surfaces $R_1$ to $R_4$, axial thicknesses $t_1$ and $t_2$ and separated by axial separation $s_1$. The film plane is preferably generally concentric with the surfaces $R_1$ to $R_3$ and is spaced an axial separation $s_2$ from the surface $R_1$ along the optical axis 5 of the objective. The axis 5 is at an angle $\theta$ to the physical axis 4 which is about 10.6 degrees in a preferred embodiment of the invention. The surfaces $R_1$ to $R_3$ are refractive and concentric with one another and have a common center point 6 which is the center of the mirror surface $R_4$. The lens $L_1$ is a negative meniscus lens. The film plane 3 is positioned completely below the longitudinal axis 4, and is just below the axis 4. All light entering the objective does so above the axis 4, the film plane 3 acting as a stop below the longitudinal axis 4. The film plane is at an average angle $\alpha$ relative to the normal to the axis 4, and the angle $\alpha$ preferably is about two degrees.

Since only light striking the mirror surface $R_4$ is focused back onto the film plane, the periphery of the surface $R_4$ may be considered to be a stop and the objective is completely symmetrical about the stop. As a result, all aberrations introduced by rays approaching the mirror surface $R_4$ are balanced out as the rays travel out of the lenses from the mirror surface $R_4$, except for spherical aberration and curvature of field, both of which are corrected by the curvature of the film plane 3 and the tilt of the plane 3, its curvature being approximately centered on the central point of the mirror surface $R_4$. The film transport preferably is horizontal.

A preferred example of the embodiment of the invention shown in FIG. 1 has an equivalent focal length of 1.011 inches and back focal length $s_2$ of .240 inch, and conforms with the following table in which dimensions are in terms of inches and the indices of refraction for the sodium D line and the Abbe dispersion numbers are respectively designated at $n_d$ and V:

| | | | | |
|---|---|---|---|---|
| $L_1$ | $R_1 = +.621$ | $t_1 = .100$ | $n_d = 1.605$ | $V = 43.4$ |
| | $R_2 = +.521$ | $s_1 = .050$ | | |
| $L_2$ | $R_3 = +.471$ | $t_2 = .471$ | $n_d = 1.523$ | $V = 58.8$ |
| | $R_4 =$ Plano (Reflective) | | | |

By reason of its symmetrical construction, the above objective is completely corrected for all aberrations at all field angles except for spherical aberration and curvature of field which are compromised by the film plane being tilted slightly from the normal to the optical axis. Hence, the objective is well adapted for extremely wide field angles.

In the embodiment shown in FIG. 2, the objective consists of a single lens $L_{11}$ having a spherical, convex, refractive front surface $R_{11}$ and a plano reflective rear surface $R_{12}$. The radius of curvature of the surface $R_{11}$ is equal to axial thickness $t_{11}$ of the lens. The film plane or aperture 13 is completely below the longitudinal axis 14 and is just below the axis 14, and 15 designates the optical axis of the objective and is oblique at an angle $\theta$. Preferably the film plane 13 is tilted to be a small angle $\alpha$ from the normal to the axis 14 and so curved as to be generally concentric with the surface $R_{11}$. In a preferred embodiment of the invention the angle $\alpha$ is two degrees and the angle $\theta$ is 10.6 degrees.

A preferred example of the objective shown in FIG. 2 is constructed in conformity with the following table in which dimensions are in terms of inches and the index of refraction for the sodium D line and the Abbe dispersion numbers are respectively designated at $n_d$ and V.

[Equivalent focal length=1.000. Back focal length=.313. Relative aperture f/4]

| | | | |
|---|---|---|---|
| $L_1$ | $R_{11} = +.687$ | $n_d = 1.523$ | $V = 58.6$ |
| | $R_{12} =$ Plano (Reflective) | | |

The objective of FIG. 2 has very low axial color aberration uniform throughout the field, low spherical aberration and no field curvature since the film plane is tilted to the angle $\alpha$ and curved to correct this, and is completely corrected for lateral color, coma, astigmatism and distortion. While the film plane preferably is curved so that the field plane may be flat, the film plane also may be flat and the field plane or screen may be curved.

The objective shown in FIG. 3 is similar to that shown in FIG. 2 but is achromatic. The objective of FIG. 3 has a single compound component 21 composed of two lenses $L_{21}$ and $L_{22}$ having radii of curvature of spherical optical surfaces $R_{21}$ to $R_{23}$ and axial thicknesses $t_{21}$ and $t_{22}$. The radii $R_{21}$ and $R_{22}$ are concentric with their center at the center of the rear surface $R_{23}$, which is a mirror surface and is plano. The optical axis is designated at 25, the longitudinal axis at 24 and the film plane at 23.

A preferred embodiment of the objective shown in FIG. 3 is constructed in accordance with the following table in which dimensions are in terms of inches and the indices of refraction for the sodium D line and the Abbe dispersion numbers are respectively designated at $n_d$ and V:

[Equivalent focal length=1.000. Back focal length=.4366. Relative aperture f/2.5]

| | | | | |
|---|---|---|---|---|
| $L_{21}$ | $R_{21}=+.563$ | $t_{21}=.3124$ | $n_d=1.649$ | V=33.9 |
| $L_{22}$ | $R_{22}=+.2506$ | $t_{22}=.2506$ | $n_d=1.523$ | V=55.6 |
| | $R_{23}$=Plano (Reflective) | | | |

The objective shown in FIG. 3 gives full color correction and very low spherical aberration while being completely free of all other optical aberrations, the angle α is preferably about two degrees and the angle θ about 10.6 degrees.

The objective shown in FIG. 4 is of the on axis type and comprises a simple meniscus component $L_{31}$ positioned behind a diaphragm or stop 32 a distance $s_{31}$ which is equal to the radius of curvature $R_{31}$ of spherical refractive front surface of the lens $L_{31}$, and rear spherical reflective surface $R_{32}$ is concentric with the front surface $R_{31}$. Film plane 33 is positioned on the longitudinal axis 34 which also is the optical axis. The plane 33 is flat and normal to the optical axis. In this objective, the curvature of the reflective surface $R_{32}$ insures a flat field.

A preferred example of the objective of FIG. 4 is constructed in conformity with the following table in which dimensions are in terms of inches, $t_{31}$ designates axial thickness of the lens $L_{31}$, $s_{31}$ the axial distance from the stop 32 to the surface $R_{31}$, and $n_d$ the index of refraction for the sodium D line and V the Abbe dispersion number:

[Equivalent focal length=1.001. Back focal length=.738]

| | | | | |
|---|---|---|---|---|
| $L_{31}$ | $R_{31}=-1.739$ | $t_{31}=.435$ | $n_d=1.523$ | V=55.6 |
| | $R_{32}=-2.1739$ (Reflective) | | | |
| | $s_{31}=1.739$ | | | |

While the invention is thus described, it is not wished to be limited to the precise details described, as changes may be readily made without departing from the spirit of the invention.

What is claimed is:

1. In a catadioptric objective, a substantially plano reflective surface, a lens component having a convex refractive surface of a radius equal to the axial distance of the refractive surface from the reflective surface, and a film plane positioned completely to one side of the longitudinal axis of the objective and tilted slightly relative to the normal of the optical axis of the objective.

2. In a catadioptric objective, a front meniscus lens component convex to the front, a rear convex-plano lens-mirror component convex to the front with the rear surface thereof reflective and plano, all the lens surfaces being concentric with the center of the reflective surface, means permitting entrance of light obliquely into the objective on one side of the longitudinal axis of the objective, and a film plane completely on the other side of said longitudinal axis and in front of the front component, the film plane being tilted relative to the normal of the optical axis of the objective to compensate for curvature of field and keystoning.

3. The objective of claim 2 wherein the film plane is concentric with the refractive surfaces of the components.

4. In a catadioptric system, a catadioptric component having a spherical refractive surface and a plano reflective surface, the refractive surface being concentric with the center of the reflective surface and the reflective and refractive surfaces being axially aligned on the longitudinal axis of the objective, and a film plane positioned completely to one side of the longitudinal axis of the objective and being tilted slightly relative to the normal of the optical axis of the objective so as to compensate for curvature of field and keystoning.

5. In a catadioptric objective, a front meniscus singlet, a rear convex plano singlet having a reflective rear surface, and a curved film plane in front of the front singlet, and being further characterized in that the objective complies substantially with the following table in which dimensions are in terms of inches and proceeding from front to rear $L_1$ and $L_2$ designate the singlets, $R_1$ to $R_4$ the respective radii of curvature of the optical surfaces, $t_1$ and $t_2$ the axial thicknesses, $s_1$ the axial separation, $n_d$ the indices of refraction for the sodium D line and V the Abbe dispersion numbers:

| | | | | |
|---|---|---|---|---|
| $L_1$ | $R_1=+.621$ | $t_1=.100$ | $n_d=1.605$ | V=43.4 |
| | $R_2=+.521$ | $s_1=.050$ | | |
| $L_2$ | $R_3=+.471$ | $t_2=.471$ | $n_d=1.523$ | V=58.8 |
| | $R_4$=Plano (Reflective) | | | |

6. In a catadioptric objective, a singlet lens having a plano reflective rear surface and a convex refractive front surface, and the objective being constructed substantially in conformity with the following table in which dimensions are in terms of inches, and proceeding from front to rear $L_{11}$ designates the lens, $R_{11}$ and $R_{12}$ the optical surfaces, $t_{11}$ the axial thickness, and $n_d$ and V respectively the index of refraction for the sodium D line and the Abbe dispersion number:

[Equivalent focal length=1.000. Back focal length=.313. Relative aperture f/4]

| | | | | |
|---|---|---|---|---|
| $L_{11}$ | $R_{11}=+.687$ | $t_{11}=.687$ | $n_d=1.523$ | V=58.6 |
| | $R_{12}$=Plano (Reflective) | | | |

7. In a catadioptric objective, a cemented doublet having a reflective rear surface, the objective being constructed in substantial compliance with the following table in which dimensions are in terms of inches and proceeding from front to rear, $L_{21}$ and $L_{22}$ designate the lenses, $R_{21}$ to $R_{23}$ the radii of curvature of the surfaces, $t_{21}$ and $t_{22}$ the axial thicknesses, $n_d$ the respective indices of refraction for the sodium D line and V the Abbe dispersion numbers:

[Equivalent focal length=1.000. Back focal length=1.000. Relative aperture f/2.5]

| | | | | |
|---|---|---|---|---|
| $L_{21}$ | $R_{21}=+.563$ | $t_{21}=.3124$ | $n_d=1.649$ | V=33.9 |
| $L_{22}$ | $R_{22}=+.2506$ | $t_{22}=.2506$ | $n_d=1.523$ | V=55.6 |
| | $R_{23}$=Plano (Reflective) | | | |

8. In a catadioptric objective, a meniscus component concave forwardly and having a reflective rear surface and a refractive front surface, and a stop positioned substantially 1.739 inches in front of the front surface of the component, the objective being constructed in substantial conformity with the following table in which dimensions are in terms of inches and $L_{31}$ designates the component, $R_{31}$ and $R_{32}$ the radii of the respective front and rear surfaces, $t_{31}$ the axial thickness, and $n_d$ and V respectively the index of refraction for the sodium D line and the Abbe dispersion number:

[Equivalent focal length=1.001. Back focal length=.738]

| | | | | |
|---|---|---|---|---|
| $L_{31}$ | $R_{31}=-1.739$ | $t_{31}=.435$ | $n_d=1.523$ | $V=55.6$ |
| | $R_{32}=-2.1739$ (Reflective) | | | |

References Cited in the file of this patent

UNITED STATES PATENTS

| | | |
|---|---|---|
| 620,978 | Schupmann | Mar. 14, 1899 |
| 1,783,998 | Chretien | Dec. 9, 1930 |
| 1,967,214 | Acht | July 24, 1934 |
| 1,972,019 | Kanolt | Aug. 28, 1934 |
| 1,977,027 | Vaughan | Oct. 16, 1934 |
| 2,141,884 | Sonnefeld | Dec. 27, 1938 |
| 2,367,567 | Darby | Jan. 16, 1945 |
| 2,492,461 | Bouwers | Dec. 27, 1949 |
| 2,571,657 | Bennett | Oct. 16, 1951 |
| 2,585,009 | Henroteau | Feb. 12, 1952 |
| 2,592,329 | Picard et al. | Apr. 8, 1952 |
| 2,642,488 | Epstein | June 16, 1953 |
| 2,866,374 | Lewis et al. | Dec. 30, 1958 |